US011380948B2

(12) United States Patent
Shimizu et al.

(10) Patent No.: US 11,380,948 B2
(45) Date of Patent: Jul. 5, 2022

(54) BATTERY MODULE

(71) Applicant: Panasonic Intellectual Property Management Co., Ltd., Osaka (JP)

(72) Inventors: Keisuke Shimizu, Osaka (JP); Akira Takano, Osaka (JP); Shinya Motokawa, Osaka (JP); Yoshito Kaga, Osaka (JP); Takeshi Enomoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/320,096

(22) PCT Filed: Jul. 6, 2017

(86) PCT No.: PCT/JP2017/024772
§ 371 (c)(1),
(2) Date: Jan. 24, 2019

(87) PCT Pub. No.: WO2018/025567
PCT Pub. Date: Feb. 8, 2018

(65) Prior Publication Data
US 2019/0267686 A1    Aug. 29, 2019

(30) Foreign Application Priority Data

Aug. 5, 2016 (JP) .............................. JP2016-154284

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/647* (2015.04);
(Continued)

(58) Field of Classification Search
CPC .......... H01M 10/655; H01M 10/6554; H01M 10/6556; H01M 10/6567; H01M 10/6568
See application file for complete search history.

(56) References Cited

U.S. PATENT DOCUMENTS

| 2011/0206948 A1* | 8/2011 | Asai | .................. H01M 10/6556 |
| | | | 429/7 |
| 2012/0003522 A1* | 1/2012 | Fuhr | .................... H01M 10/643 |
| | | | 429/120 |

(Continued)

FOREIGN PATENT DOCUMENTS

| CN | 103890995 A | 6/2014 |
| JP | 2012-119136 | 6/2012 |
| JP | 2015-026620 | 2/2015 |

OTHER PUBLICATIONS

International Search Report of PCT application No. PCT/JP2017/024772 dated Aug. 15, 2017.
(Continued)

*Primary Examiner* — Ula C Ruddock
*Assistant Examiner* — Armindo Carvalho, Jr.
(74) *Attorney, Agent, or Firm* — McDermott Will & Emery LLP

(57) ABSTRACT

A battery module includes a battery assembly and a thermally-conductive member to hold or support battery assembly. The battery assembly has a plurality of first batteries and a plurality of second batteries that are alternately stacked. The thermally-conductive member includes a first component and a second component that are each disposed along a stacking direction of the batteries. The first component has a heat resistance to the second batteries higher than to the first batteries. The second component has a heat resistance to the first batteries higher than to the second batteries.

7 Claims, 10 Drawing Sheets

(51) Int. Cl.
- H01M 10/647 (2014.01)
- H01M 10/6556 (2014.01)
- H01M 10/6568 (2014.01)
- H01M 10/6567 (2014.01)
- H01M 50/20 (2021.01)

(52) U.S. Cl.
CPC ... *H01M 10/6556* (2015.04); *H01M 10/6567* (2015.04); *H01M 10/6568* (2015.04); *H01M 50/20* (2021.01)

(56) References Cited

U.S. PATENT DOCUMENTS

2013/0071717 A1* 3/2013 Muniz ................ H01M 10/613
  429/120
2014/0220391 A1* 8/2014 Fujii ...................... B60L 50/66
  429/7

OTHER PUBLICATIONS

English Translation of Chinese Office Action dated Jun. 2, 2021 for the related Chinese Patent Application No. 201780046079.3.

* cited by examiner

BATTERY MODULE

CROSS-REFERENCE TO RELATED APPLICATIONS

This application is the National Phase in the United States of PCT/JP2017/024772, filed Jul. 6, 2017, which claims priority to Japanese Patent Application No. 2016-154284, filed Aug. 5, 2016. Both of those applications are incorporated by reference herein in their entireties.

TECHNICAL FIELD

The present disclosure relates to a battery module.

BACKGROUND ART

A conventionally known battery module, as is disclosed in Unexamined Japanese Patent Publication No. 2012-119136, includes a plurality of cylindrical batteries and a battery holder having a plurality of battery containers to store the respective batteries. A battery module disclosed in this reference is designed such that a battery holder has a thermal capacity that is higher at a middle of the holder than at outer sides of the holder to equalize temperatures of batteries stored in the battery holder.

BRIEF SUMMARY

If one battery of the batteries that make up the battery module abnormally generates heat, heat generated by the battery is presumably apt to be transmitted to a battery next to the abnormal battery among the other normal batteries, so that the neighboring battery as well abnormally generates heat due to the heat transfer. Thermal harm may extend sequentially in the module, resulting in infliction of thermal damage on a device or other equipment around the module.

A battery module according to the present disclosure includes a battery assembly and a thermally-conductive material to hold or support the battery assembly. The battery assembly has a plurality of first batteries and a plurality of second batteries that are alternately stacked. The thermally-conductive member includes a first component and a second component that are each disposed along a stacking direction of the batteries. The first component has a heat resistance to the second batteries higher than to the first batteries. The second component has a heat resistance to the first batteries higher than to the second batteries.

Even if a part of the batteries incorporated in the battery module abnormally generates heat, the battery module according to the present disclosure can reduce an impact of the heat on the other normal batteries and satisfactorily avert sequential extension of thermal harm.

DETAILED DESCRIPTION

Figure 1:
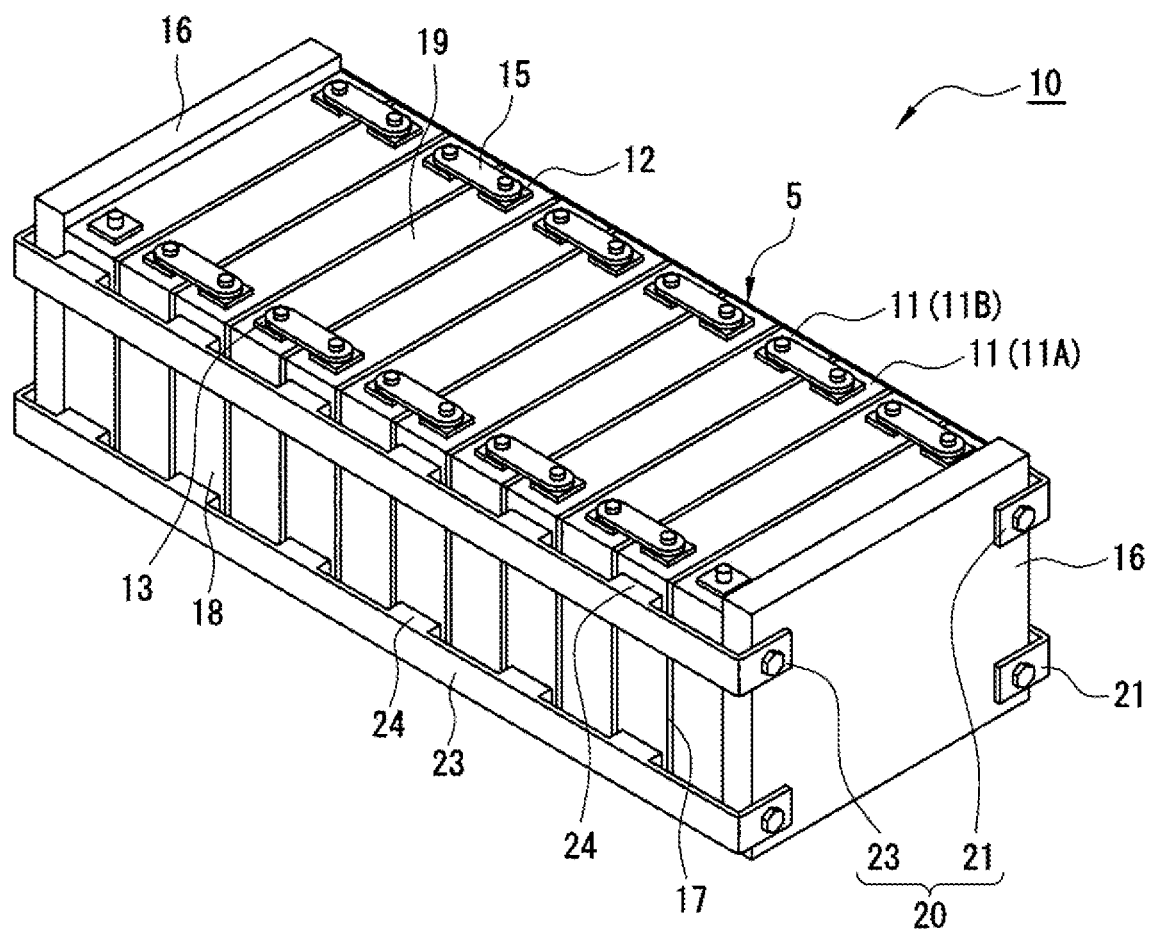
FIG. 1 is a perspective view of a battery module according to a first exemplary embodiment.

As described above, a major challenge for a battery module incorporating a plurality of batteries is to avert sequential extension of thermal harm in the event of abnormal heat generation by a part of the batteries. The inventors of the present disclosure have solved the challenge by the use of the thermally-conductive material described above. A battery module according to an aspect of the present disclosure can satisfactorily avert sequential extension of thermal harm without producing undesirable effects such as increases in module size, structural complication, and cost.

If one of the batteries in a conventional battery module abnormally generates heat, the heat is apt to be transmitted to a battery next to the abnormal battery due to a close range. If a heat radiator with a high thermal conductivity is installed in the module, heat is diffused via the heat radiator. Even in this case, an amount of heat transferred to a battery next to the abnormal battery increases. A battery module according to the present disclosure can efficiently release heat from an abnormal battery and decrease the amount of heat transferred to a battery next to the abnormal battery. The decrease in the amount of heat transfer is implemented by a thermally-conductive member according to the present disclosure.

Because of a structure of the thermally-conductive member according to the present disclosure, no heat transfer channel is shared by the adjacent batteries. This configuration greatly suppresses the transfer of heat to a battery next to the abnormal battery via the thermally-conductive member (e.g., a first component), while heat generated by the abnormal battery is diffused and radiated via the thermally-conductive member (the first component). Heat is partly transferred to the battery next to the abnormal battery. Nevertheless, heat transferred to the next battery is radiated through a channel separate from the abnormal battery, i.e., through the member (a second component) on which the abnormal battery makes a negligible thermal impact. This configuration can lower concentration of heat on a battery next to an abnormal battery and thereby satisfactorily avert a chain reaction of abnormal heat generation and resultant extension of thermal harm.

An example of a battery module according to an exemplary embodiment of the present disclosure will now be described in detail with reference to the attached drawings. However, the battery module according to the present disclosure is not limited to the exemplary embodiments described below. Drawings referred to in a description of any of the exemplary embodiments are schematically drawn, and thus dimensions of configuration elements illustrated in the drawings should be understood in view of the following description. In the description herein, "substantially constant" means absolutely constant, as well as virtually constant, for example. Other words modified by "substantially" should be interpreted in the same manner.

The battery described hereafter is a prismatic battery (battery 11) having a rectangular metallic case that includes an outer can and a sealing body for example. The battery may be any battery other than this example. In the description, a first component and a second component making up a thermally-conductive material are in contact with respective batteries that differ from each other. These components may not be in contact with batteries, with proviso that the adjacent batteries are disposed so as to differ from each other in resistance to heat (thermal conductivity). In the description herein, "contact" means direct contact between two components unless otherwise specified and also includes states in which components are substantially or virtually in direct contact with each other (e.g., a situation in which an adhesive agent, for example, that has no impact in thermal conductivity exists between two components).

First Exemplary Embodiment

Figure 2:
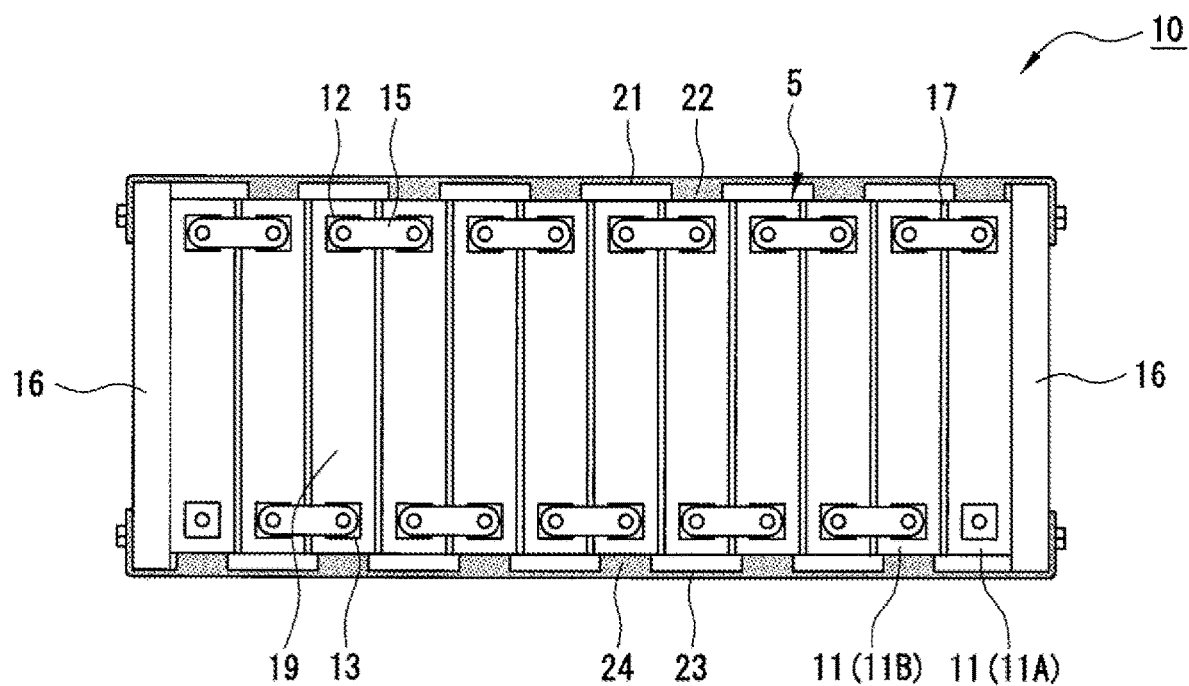
FIG. 2 is a plan view of the battery module according to the first exemplary embodiment.

With reference to FIGS. 1 to 4, battery module 10 according to a first exemplary embodiment will be described below in detail. FIG. 1 is a perspective view of battery module 10, and FIG. 2 is a plan view of battery module 10.

As illustrated in FIGS. 1 and 2, battery module 10 includes battery assembly 5 having a plurality of first batteries 11A and a plurality of second batteries 11B that are alternately stacked and a thermally-conductive member configured to hold or support battery assembly 5. The thermally-conductive member includes a first component and a second component that are each disposed along a stacking direction of batteries 11A, 11B. The first component has a heat resistance to batteries 11B higher than to batteries 11A, whereas the second component has a heat resistance to batteries 11A higher than to batteries 11B. In other words, heat is transferred to the first component more readily from battery 11A than from battery 11B, and heat is transferred to the second component more readily from battery 11B than from battery 11A.

Batteries 11A, 11B may be batteries that differ from each other in properties such as capacity, size, or type. Preferably, batteries 11A, 11B are identical batteries 11. In this exemplary embodiment, batteries 11A, 11B are identical batteries disposed in different orientations such that lateral positions of positive and negative terminals of these batteries are in an inverse relationship with each other. In this specification, for the convenience of description, a direction in which positive electrode terminal 12 and negative electrode terminal 13 of battery 11 stand in a line are referred to as a "lateral direction". A stacking direction of batteries 11 may be referred to as a "longitudinal direction".

Battery module 10 further includes a pair of end plates 16 that put battery assembly 5 made up of a plurality of batteries 11 therebetween in the stacking direction of batteries 11. In this exemplary embodiment, the thermally-conductive member described above is binding bar 20 that is fixed to end plates 16 to bind batteries 11 together. Binding bar 20 includes first bar 21 (the first component) and second bar 23 (the second component) that are each disposed along the stacking direction of batteries 11. Binding bar 20, along with end plates 16, binds batteries 11 together to maintain a shape of battery assembly 5.

Battery 11 has a battery case. The battery case includes outer can 18 being formed in a bottomed rectangular pipe shape and having an opening at an upper end, and sealing body 19 to seal the opening of outer can 18. The battery case is a rectangular metallic case, and as described above, battery 11 is a prismatic battery. Battery 11 is, for example, a non-aqueous electrolyte secondary battery such as a lithium ion battery, a nickel-metal hydride battery, or a nickel-cadmium battery. Outer can 18 contains an electrode assembly and a non-aqueous electrolyte solution that constitute a non-aqueous electrolyte secondary battery.

Outer can 18 has a flat or compressed shape that is longer in the lateral direction and a vertical direction (perpendicular to the longitudinal and lateral directions) than in the longitudinal direction and that is long especially in the lateral direction. However, the shape of the outer can is not particularly limited. Outer can 18 is made from a metal material that is primarily composed of aluminum, for example. A resin film is put on an external surface of outer can 18 to ensure insulation. Sealing body 19 is a substantially rectangular component that is long laterally and designed to cover the opening of outer can 18 so as to hermetically seal an interior space of the battery case. A periphery of sealing body 19 is welded to a peripheral edge of the opening of outer can 18, for example.

Sealing body 19 is provided with positive and negative electrode terminals 12 and 13. In an example shown in FIG. 1, sealing body 19 for battery 11A has positive electrode terminal 12 on one end and negative electrode terminal 13 on the other end in the lateral direction. Sealing body 19 for battery 11B has negative electrode terminal 13 on one end and positive electrode terminal 12 on the other end in the lateral direction. Through-holes are formed in the two ends of sealing body 19 in the lateral direction, for example, and these terminals are attached to the through-holes via respective insulating gaskets.

Battery module 10 has a structure in which a plurality of batteries 11 are stacked in one direction with a plurality of insulating boards 17 each interposed between the adjacent batteries. Although the insulating resin film is put on outer can 18 of battery 11, it is preferable in view of improved insulation performance that insulating boards 17 are each disposed between adjacent batteries 11. In battery assembly 5, as described above, batteries 11 are disposed such that lateral positions of the positive and negative terminals of adjacent batteries 11 are in the inverse relationship with each other. Thus, positive electrode terminals 12 and negative electrode terminals 13 are arrayed in alternate order along the stacking direction of batteries 11.

Battery module 10 includes bus bars 15 that each electrically connect adjacent batteries 11. In an example shown in FIG. 1, bus bars 15 connect between positive electrode terminal 12 of battery 11A and negative electrode terminal 13 of battery 11B and between negative electrode terminal 13 of battery 11A and positive electrode terminal 12 of battery 11B. In other words, batteries 11 incorporated in battery module 10 are connected in series. However, a form of connected batteries 11 is not limited to this example. Although heat transfer via bus bar 15 occurs in response to heat abnormally generated by a part of batteries 11, the impact of such heat transfer is adequately alleviated by binding bar 20 as described later.

In battery module 10, batteries 11 are bound together by binding bar 20 being fixed to end plates 16, which are provided on both ends of battery assembly 5 in the longitudinal direction, and pressing these end plates against battery assembly 5. Each end plate 16 is a plate-shaped body made of a resin, for example, and is formed with a size larger than battery 11. End plate 16 has bolt holes that are formed for fastening binding bar 20.

Since binding bar 20 is fixed to end plates 16 so as to suppress swelling of batteries 11, end plates 16 may be made from aluminum or other metal to achieve improved stiffness. In this case, insulating board 17 is interposed between end plate 16 and battery 11 adjacent to end plate 16 in the same way as between batteries 11 to ensure insulation between end plate 16 and battery 11. In the case of use of metallic end plates 16, the positive and negative electrode terminals of the battery assembly integrating batteries 11 are surely insulated from end plates 16 on both ends of the battery assembly.

Binding bar 20, as described above, has a function of holding and maintaining bound batteries 11 together with end plates 16. Binding bar 20 includes first bars 21 disposed on a first side of battery assembly 5 along the longitudinal direction and second bars 23 disposed on a second side of battery assembly 5 along the longitudinal direction. First bars 21 and second bars 23 are disposed so as to put batteries 11 therebetween in the lateral direction, and preferably confront each other through the batteries. In an example shown in FIG. 1, a total of four bars, i.e., two first bars 21 and two second bars 23, are disposed. However, numbers of respective bars are not limited to this example. A total of four bars may be disposed such that one first bar 21 and one second bar 23 are disposed on each side of battery assembly 5.

First bars 21 are disposed on an upper part and a lower part of battery assembly 5, respectively so as to run parallel to a lateral surface of battery assembly 5. Similarly, second bars 23 are disposed on an upper part and a lower part of battery assembly 5, respectively so as to run parallel to a lateral surface of battery assembly 5. First and second bars 21 and 23 are each a metallic plate-shaped component having a substantially constant width (a length in the vertical direction), for example. Specifically, a thickness (a length in the lateral direction) of the component is not constant as described later. The bars may be made of a resin. In an example shown in FIG. 1, both end portions of each bar in the longitudinal direction are bent so as to fit onto longitudinal end faces of respective end plates 16. The bent portions are fastened to end plates 16 with bolts.

As illustrated in FIG. 2, first and second bars 21 and 23 are each in contact with a plurality of batteries 11. Batteries 11 that the two bars are respectively in contact with differ from each other. In an example shown in FIG. 2, the two bars are disposed such that first bar 21 is in contact with batteries 11A, whereas second bar 23 is in contact with batteries 11B. Meanwhile, first bar 21 is not in contact with batteries 11B, whereas second bar 23 is not in contact with batteries 11A. In other words, each battery 11 is in contact with any one of first bar 21 and second bar 23. In response to heat abnormally generated by a part of batteries 11, first and second bars 21 and 23 serve as heat radiators to diffuse that heat.

Since first bar 21 is in contact with batteries 11A and is not in contact with batteries 11B, first bar 21 has a heat resistance to batteries 11B higher than to batteries 11A. Heat is readily transferred from batteries 11A to first bar 21, and heat is hard to transfer from batteries 11B to first bar 21. On the other hand, since second bar 23 is in contact with batteries 11B and is not in contact with batteries 11A, second bar 23 has a heat resistance to batteries 11A higher than to batteries 11B. Heat is readily transferred from batteries 11B to second bar 23, and heat is hard to transfer from batteries 11A to second bar 23. Owing to binding bar 20 installed in this manner, separate heat transfer channels are formed for adjacent batteries 11.

First bar 21 has a plurality of projections 22 protruding inward (toward batteries 11). In other words, projections and depressions are formed on an inside surface of first bar 21. Meanwhile, an outside surface of first bar 21 is substantially flat. Thus, the thickness of first bar 21 varies from position to position along the longitudinal direction. Projections 22 are formed so as to correspond with respective batteries 11A and are in contact with lateral surfaces of batteries 11A. Instead of formation of projections 22, first bar 21 may be corrugated.

Projections 22 are arrayed at regular intervals along the longitudinal direction of first bar 21. The interval between projections 22 is longer than an interval between batteries 11A, 11B (an interval between centers) and a length (a longitudinal length) of each projection 22 along the longitudinal direction of first bar 21 is shorter than a thickness (a longitudinal length) of battery 11, for example, such that projections 22 are only in contact with batteries 11A. Accordingly, regular projections and depressions are formed on the inside surface of first bar 21. Projections 22 are in contact with alternate batteries 11 (batteries 11A) along the longitudinal direction.

Second bar 23, in common with first bar 21, has a plurality of projections 24 protruding inward. Projections 24 are arrayed at regular intervals along the longitudinal direction of second bar 23. Regular projections and depressions are formed on an inside surface of second bar 23. Projections 24 are in contact with lateral surfaces of alternate batteries 11 (batteries 11B) along the longitudinal direction. The projections of first bar 21 are identical to the projections of second bar 23 in pitch, size, and other properties, for example, so that first and second bars 21 and 23 are identical components disposed in different orientations.

Figure 3A:
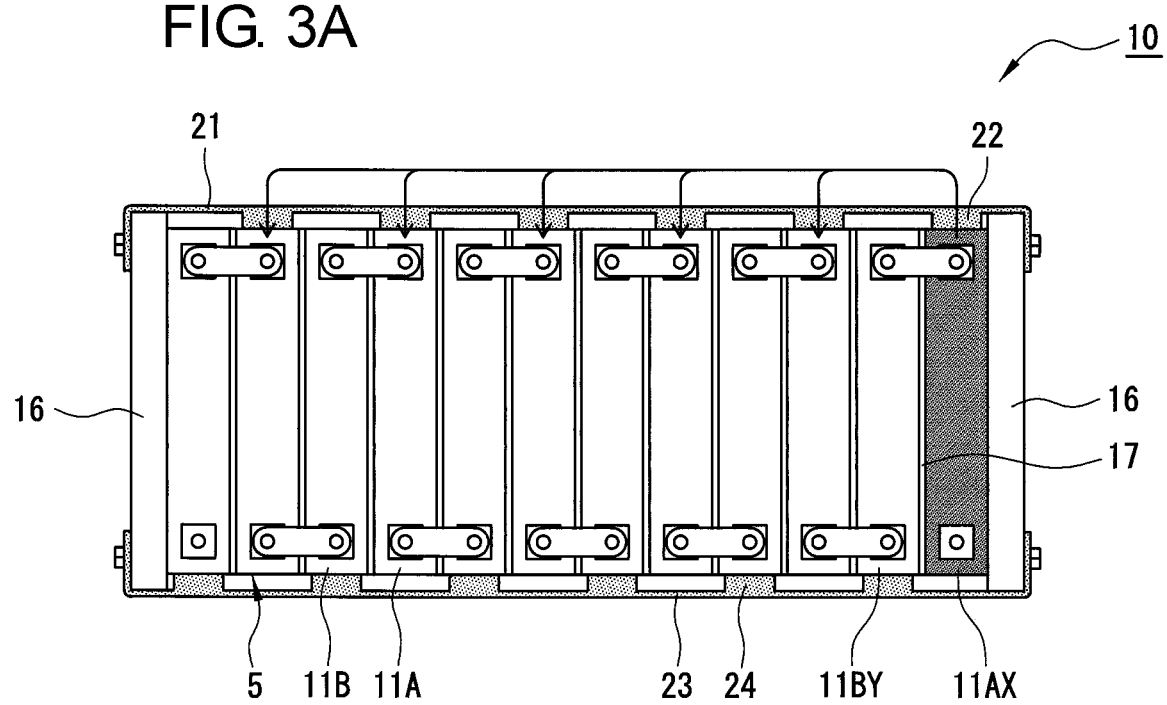
FIGS. 3A and 3B are made up of drawings illustrating a function performed by the battery module according to the first exemplary embodiment.
Figure 3B:
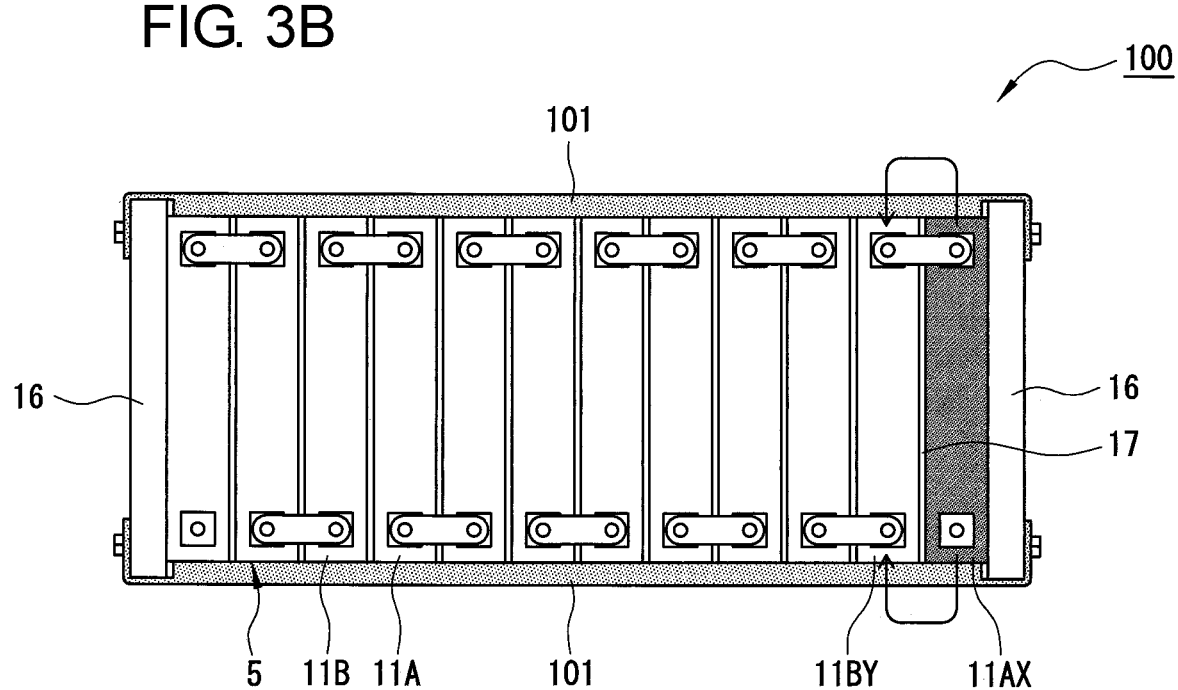

FIG. 3A is a drawing illustrating a function performed by battery module 10 having the above-described configuration and showing a situation in which battery 11AX has abnormally generated heat. FIG. 3B shows a comparative example of battery module 100 that includes binding bar 101 in contact with all batteries 11. In both battery modules 10, 100, heat abnormally generated by battery 11AX is transferred to a nearest battery, i.e., adjacent battery 11BY. Nevertheless, battery module 10 enables a substantial reduction in an amount of heat transferred to battery 11BY as compared to battery module 100 and thus can reduce a thermal impact on battery 11BY.

In the structure of battery module 10, as described above, no heat transfer channel is shared by adjacent batteries 11. As shown in FIG. 3A, battery 11AX is in direct contact with first bar 21 and is not contact with second bar 23. On the other hand, battery 11BY is in direct contact with second bar 23 and is not contact with first bar 21. As a result, heat generated by battery 11AX is readily transferred to first bar 21 and is diffused and radiated via first bar 21. Because of no contact between battery 11BY and first bar 21, heat is hard to transfer through first bar 21 to battery 11BY. Heat is hard to transfer from battery 11AX to second bar 23, which battery 11BY is in contact with.

Since battery 11BY is in contact with battery 11AX through insulating board 17, heat generated by battery 11AX has an impact on battery 11BY to some degree. However, heat transferred to battery 11BY can be radiated through a channel separate from battery 11AX, i.e., through second bar 23 on which battery 11AX makes a negligible thermal impact. This configuration enables battery module 10 to lower concentration of heat on battery 11BY and thereby satisfactorily avert a chain reaction of abnormal heat generation and resultant extension of thermal harm.

Figure 4:
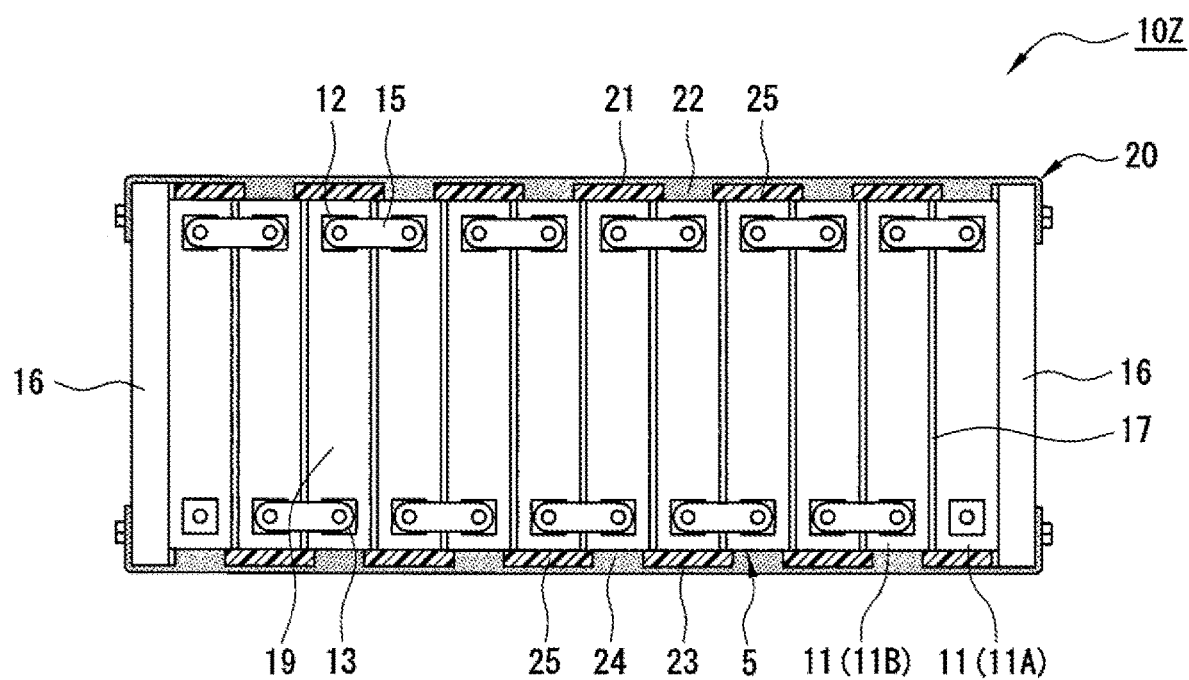
FIG. 4 is a plan view of a modification of the battery module according to the first exemplary embodiment.

FIG. 4 is a plan view of battery module 10Z, a modification of the battery module according to the first exemplary embodiment. As illustrated in FIG. 4, battery module 10Z differs from battery module 10 in that low thermally-conductive material member 25 that is lower in thermal conductivity than binding bar 20 is interposed between first bar 21 and each battery 11B and between second bar 23 and each battery 11A. Low thermally-conductive material member 25 is disposed between the projections of first bar 21 and between the projections of second bar 23, for example. In this case, the bars with low thermally-conductive members are in contact with lateral surfaces of all batteries 11, and batteries 11 are clamped between these bars. Thus, this configuration has advantages such as improved cohesion among batteries 11. This configuration also enables battery module 10Z to lower concentration of heat on a battery disposed next to an abnormal battery and satisfactorily avert sequential extension of thermal harm.

Low thermally-conductive material member 25 is satisfactory as long as the member has a thermal conductivity lower than the thermal conductivity of binding bar 20. Preferably, low thermally-conductive material member 25 is a resin-made component. Low thermally-conductive member material 25 is formed of a curable resin, for example. A preferred example of the curable resin is a resin having such a cross-linked structure as not to melt when being exposed to a temperature of 600° C. or higher and getting carbonized without melting to maintain shape of low thermally-conductive member 25 when being exposed to a high temperature ranging from 800° C. to 1,000° C. Specific examples of the resin include thermosetting resins including unsaturated polyester, an epoxy resin, a melamine resin, and a phenol resin. The curable resin forming low thermally-conductive member 25 may contain an endothermic filler. Endothermic fillers exhibit an endothermic action during thermal decomposition. Specific examples of the endothermic filler include aluminum hydroxide and sodium hydrogen carbonate. Resin-made low thermally-conductive member 25 is attached to binding bar 20 with an adhesive substance such as an adhesive agent or adhesive tape.

Figure 5:
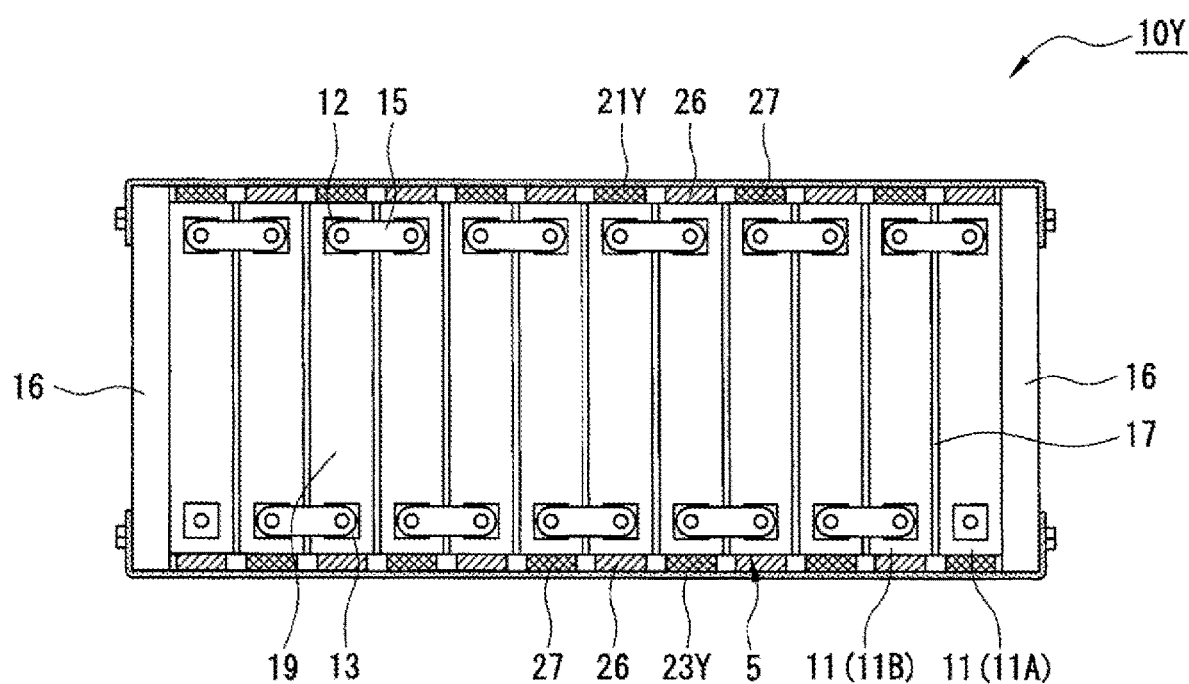
FIG. 5 is a plan view of another modification of the battery module according to the first exemplary embodiment.

FIG. 5 is a plan view of battery module 10Y, another modification of the battery module according to the first exemplary embodiment. As illustrated in FIG. 5, battery module 10Y differs from battery module 10 in that thermally-conductive material member 26 and thermal-insulating material member 27 having different thermal conductivities are alternately interposed between first bar 21Y and batteries 11 and between second bar 23Y and batteries 11. Thermally-conductive material member 26 is, for example, disposed between first bar 21Y and batteries 11A and between second bar 23Y and batteries 11B. Thermal-insulating material member 27 is, for example, disposed between first bar 21Y and batteries 11B and between second bar 23Y and batteries 11A. Thermally-conductive material member 26 may be formed of a component having thermal conductivity on a par with that of the bars or having thermal conductivity higher than that of the bars.

As a consequence, batteries 11A are thermally coupled to first bar 21Y via thermally-conductive material member 26 having satisfactory thermal conductivity, whereas batteries 11B are thermally coupled to second bar 23Y via thermally-conductive material member 26. On the other hand, batteries 11A are thermally insulated from second bar 23Y with thermal-insulating material member 27 having thermal conductivity incomparably lower than the thermal conductivity of thermally-conductive material member 26, whereas batteries 11B are thermally insulated from first bar 21Y with thermal-insulating material member 27. This configuration also enables battery module 10Y to lower concentration of heat on a battery disposed next to an abnormal battery and satisfactorily avert sequential extension of thermal harm.

Thermal conductivity (thermal resistance) between the bars and batteries 11 may be varied from battery to battery by a difference in contact pressure, contact area, or other relation between the bars and batteries 11, other than the use of a difference in material thermal conductivity between thermally-conductive material member 26 and thermal-insulating material member 27. It is preferred in view of ease of manufacturability that thermally-conductive material member 26 and thermal-insulating material member 27 be grease glues that are dissimilar in thermal conductivity and character.

Second Exemplary Embodiment

Figure 6:
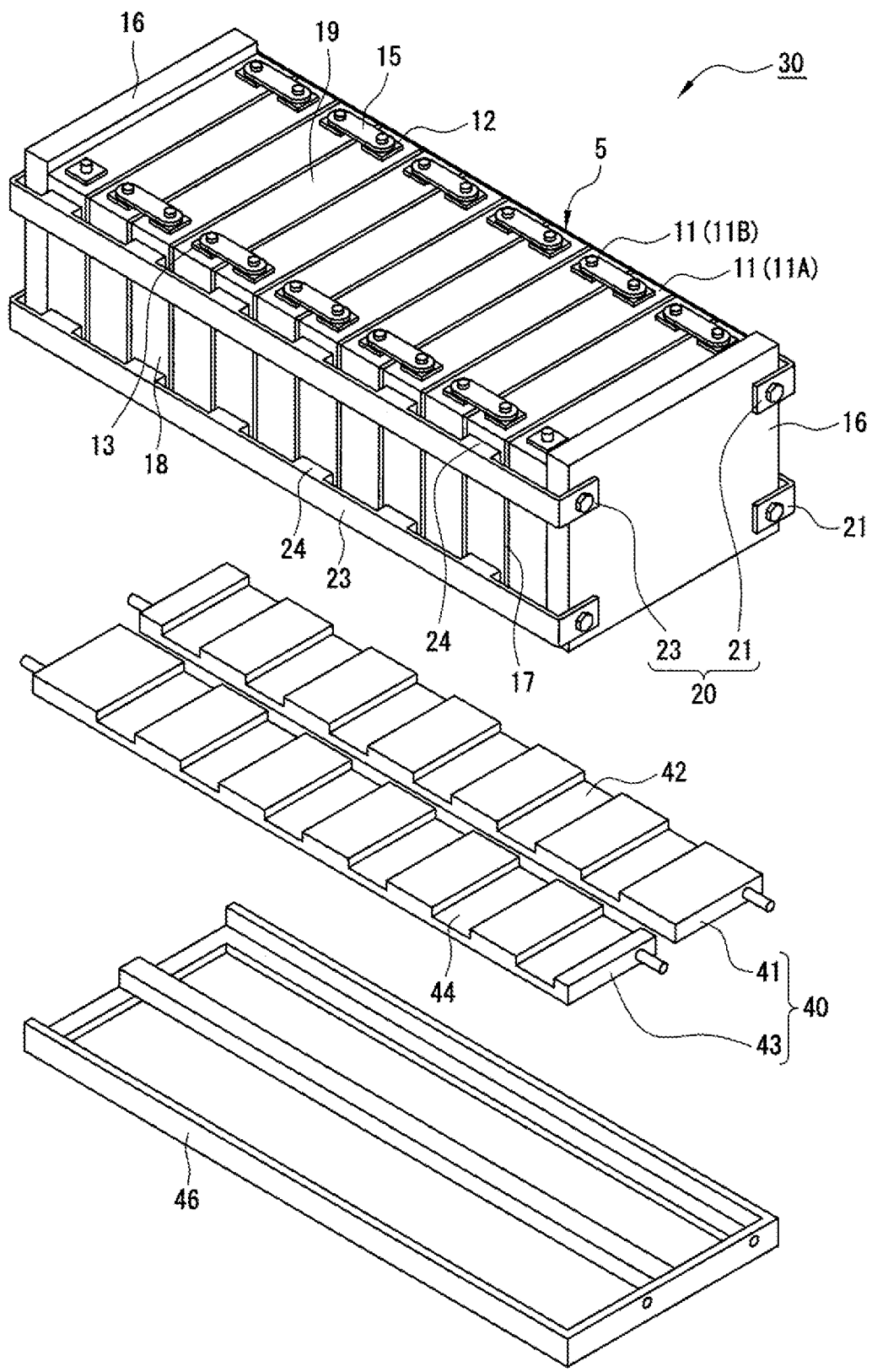
FIG. 6 is an exploded perspective view of a battery module according to a second exemplary embodiment.

With reference to FIGS. 6 to 9, battery module 30 according to a second exemplary embodiment will be described below in detail. FIG. 6 is an exploded perspective view of battery module 30. FIGS. 7A and 7B are made up of longitudinal cross-sectional views of battery module 30, in which FIG. 7A is a cross-sectional view corresponding to first plate 41 of the battery module and FIG. 7B is a cross-sectional view corresponding to second plate 43 of the battery module. In the description hereafter, components similar to those in the first exemplary embodiment are denoted by the same numerals or symbols, and redundant descriptions thereof will be omitted.

As illustrated in FIGS. 6 and 7, battery module 30, in common with battery module 10, includes binding bar 20. Unlike battery module 10, battery module 30 includes cooling plate 40 to cool battery assembly 5. Cooling plate 40 employs a liquid cooling technique for circulating a liquid refrigerant such as a coolant inside a plate, for example. The cooling plate may employ an electronic cooling technique. Battery module 30 may include an ordinary binding bar having no projections 22, 24 and being kept from contact with batteries 11 in place of binding bar 20.

In common with binding bar 20, cooling plate 40 is a thermally-conductive material having a first component and a second component that are each disposed along the stacking direction of batteries 11, and is configured to hold or support batteries 11. Cooling plate 40 includes first plate 41 (the first component) and second plate 43 (the second component) that are each disposed along the stacking direction of batteries 11. First and second plates 41 and 43 are disposed beneath batteries 11 and separated from each other by a gap. First and second plates 41 and 43 have respective individual flow paths for a refrigerant. The refrigerant flows through the paths independently of each other. First and second plates 41 and 43 are thermally isolated from each other.

Battery assembly 5 is placed on cooling plate 40 and supported by the plate. In other words, a plurality of batteries 11 making up battery assembly 5 is put on cooling plate 40, and undersurfaces of batteries 11 are in contact with cooling plate 40. Surfaces of batteries 11 in contact with cooling plate 40 may be lateral surfaces of batteries 11 making up battery assembly 5, other than the undersurfaces of batteries 11.

First plate 41 is disposed on a first lateral side of battery assembly 5 along an undersurface of battery assembly 5.

Second plate 43 is disposed on a second lateral side of battery assembly 5 along the undersurface of battery assembly 5. First and second plates 41 and 43 are each a metallic plate-shaped component having a substantially constant width. The plates are each longer in length than battery assembly 5 and extend in the longitudinal direction so as to exceed both longitudinal ends of battery assembly 5. The plates may be made of a resin. In this exemplary embodiment, cooling plate holder 46 is provided to hold the plates.

Figure 7A:
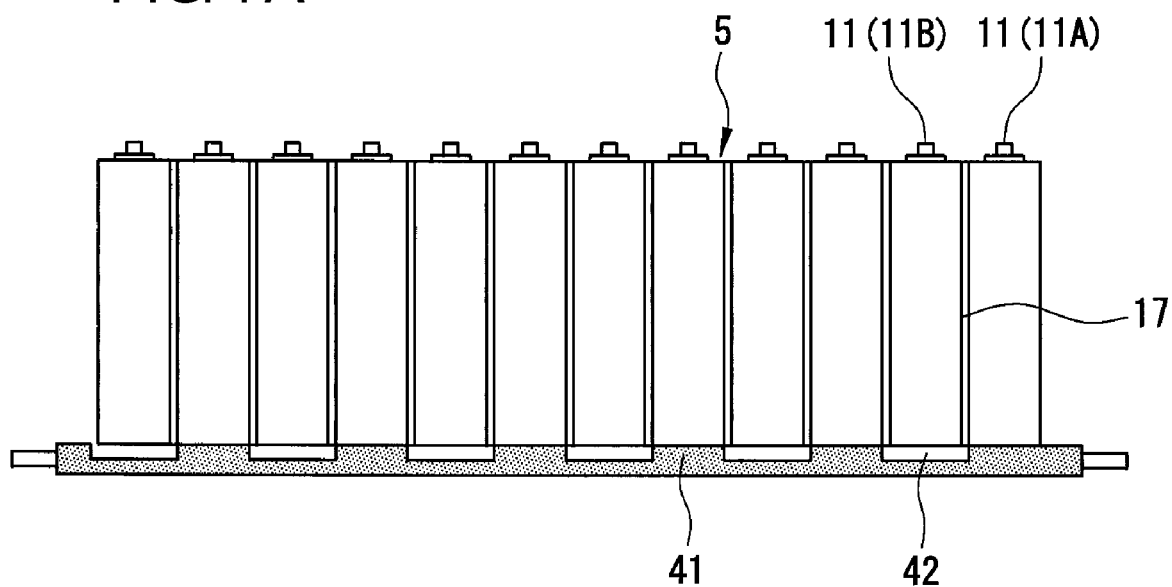
FIGS. 7A and 7B are made up of cross-sectional views of the battery module according to the second exemplary embodiment.
Figure 7B:
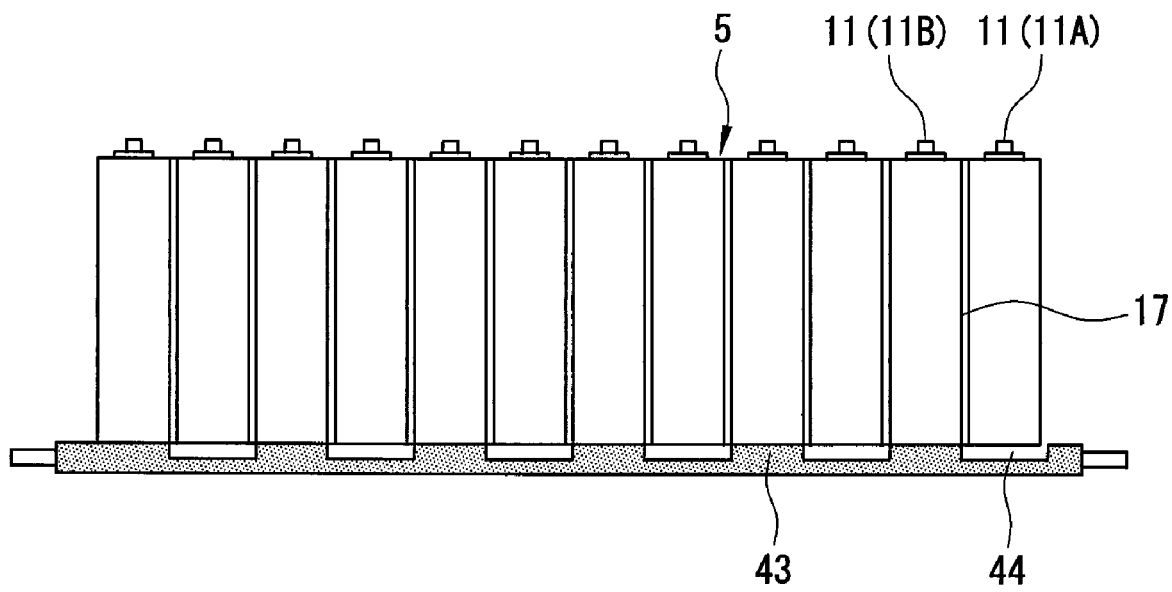

As illustrated in FIGS. 7A and 7B, first and second plates 41 and 43 are each in contact with a plurality of batteries 11. Batteries 11 that the two plates are respectively in contact with differ from each other. In an example shown in FIGS. 7A and 7B, the two plates are disposed such that first plate 41 is in contact with batteries 11A, whereas second plate 43 is in contact with batteries 11B. Meanwhile, first plate 41 is not in contact with batteries 11B, whereas second plate 43 is not in contact with batteries 11A. In other words, each battery 11 is in contact with any one of first plate 41 and second plate 43.

Since first plate 41 is in contact with batteries 11A and is not in contact with batteries 11B, first plate 41 has a heat resistance to batteries 11B higher than to batteries 11A. Heat is readily transferred from batteries 11A to first plate 41, and heat is hard to transfer from batteries 11B to first plate 41. On the other hand, since second plate 43 is in contact with batteries 11B and is not in contact with batteries 11A, second plate 43 has a heat resistance to batteries 11A higher than to batteries 11B. Heat is readily transferred from batteries 11B to second plate 43, and heat is hard to transfer from batteries 11A to second plate 43. In other words, owing to cooling plate 40, separate heat transfer channels are formed for adjacent batteries 11.

First plate 41 has a plurality of depressions 42 being recessed downward (in a direction opposite to batteries 11). In other words, projections and depressions are formed on a top surface of first plate 41 on which battery assembly 5 is placed. Meanwhile, an undersurface of first plate 41 is substantially flat. Thus, a thickness of first plate 41 varies from position to position along the longitudinal direction. Depressions 42 are formed so as to correspond with respective batteries 11B, so that a gap is created between the top surface of first plate 41 and each battery 11B. On the other hand, no depressions 42 are formed on portions of first plate 41 corresponding to batteries 11A, and first plate 41 is in contact with undersurfaces of batteries 11A. In other words, projections are formed on the portions corresponding to batteries 11A and are in contact with batteries 11A.

Depressions 42 are arrayed at regular intervals along the longitudinal direction of first plate 41. A span (a longitudinal length) of each depression 42 is longer than a thickness of battery 11 and the interval between depressions 42 is shorter than an interval between batteries A, 11B, for example, such that first plate 41 is only in contact with batteries 11A. Accordingly, regular projections and depressions are formed on the top surface of first plate 41. Depressions 42 constitute gaps between the first plate and alternate batteries 11 (batteries 11B) along the longitudinal direction. The portions of first plate 41 on which no depressions 42 are formed are in contact with the undersurfaces of batteries 11A. Since undersurfaces of batteries 11B are apart from other portions of first plate 41 where depressions 42 are formed, the undersurfaces of batteries 11B may be partly placed on cooling plate holder 46.

Second plate 43, in common with first plate 41, has a plurality of depressions 44 being recessed downward. Depressions 44 are arrayed at regular intervals along the longitudinal direction of second plate 43. Regular projections and depressions are formed on a top surface of second plate 43. Depressions 44 constitute gaps between the second plate and alternate batteries 11 (batteries 11A) along the longitudinal direction. The portions of second plate 43 on which no depressions 44 are formed are in contact with undersurfaces of batteries 11B. The depressions of first plate 41 are identical to the depressions of second plate 43 in pitch, size, and other properties, for example, so that first and second plates 41 and 43 are identical components disposed in different orientations.

Figure 8A:
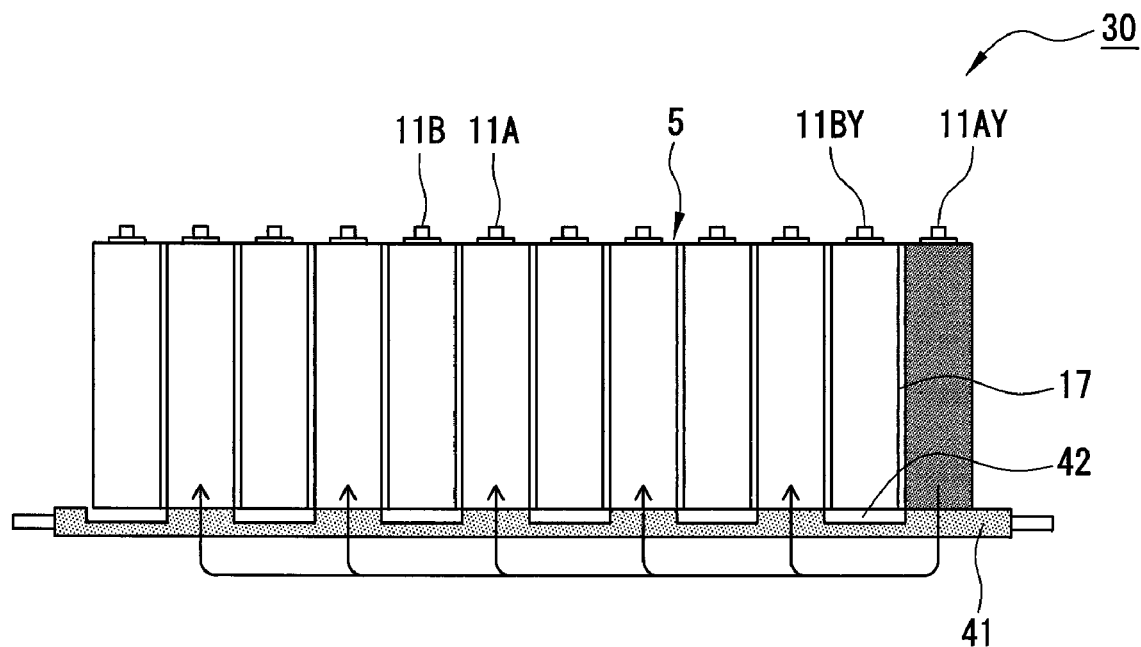
FIGS. 8A and 8B are made up of drawings illustrating a function performed by the battery module according to the second exemplary embodiment.
Figure 8B:
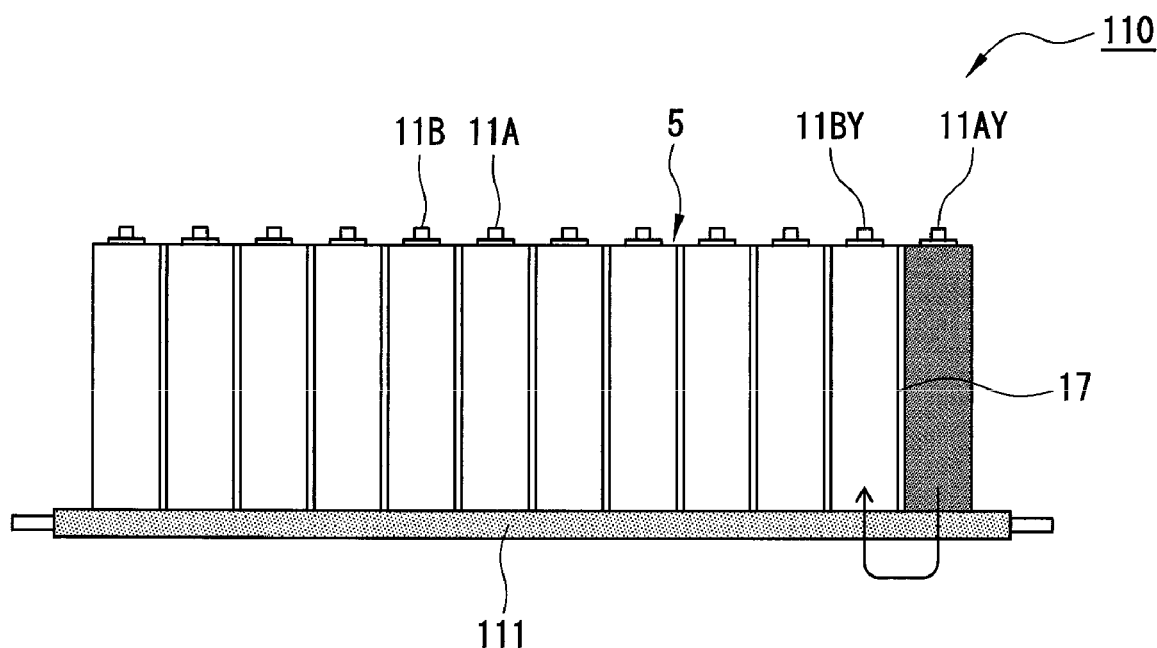

FIG. 8A is a drawing illustrating a function performed by battery module 30 having the above-described configuration and showing a situation in which battery 11AX has abnormally generated heat. FIG. 8B shows a comparative example of battery module 110 that includes cooling plate 111 in contact with all batteries 11. The function of binding bar 20 is as described above and description thereof is omitted here. In both battery modules 30, 110, heat abnormally generated by battery 11AX is transferred to a nearest battery, i.e., adjacent battery 11BY. Nevertheless, battery module 30 enables a substantial reduction in an amount of heat transferred to battery 11BY as compared to battery module 110 and thus can reduce a thermal impact on battery 11BY.

In the structure of battery module 30, as described above, no heat transfer channel is shared by adjacent batteries 11. As shown in FIG. 8A, battery 11AX is in direct contact with first plate 41 and is not contact with second plate 43. On the other hand, battery 11BY is in direct contact with second plate 43 and is not contact with first plate 41 (refer to FIGS. 7A and 7B). As a result, heat generated by battery 11AX is readily transferred to first plate 41 and is diffused and radiated via first plate 41. Because of no contact between battery 11BY and first plate 41, heat is hard to transfer through first plate 41 to battery 11BY. Heat is hard to transfer from battery 11AX to second plate 43, which battery 11BY is in contact with.

Since battery 11BY is in contact with battery 11AX through insulating board 17, heat generated by battery 11AX has an impact on battery 11BY to some degree. However, heat transferred to battery 11BY can be radiated through a channel separate from battery 11AX, i.e., through second plate 43 on which battery 11AX makes a negligible thermal impact. This configuration enables battery module 30 to lower concentration of heat on battery 11BY and thereby satisfactorily avert a chain reaction of abnormal heat generation and resultant extension of thermal harm.

Figure 9:
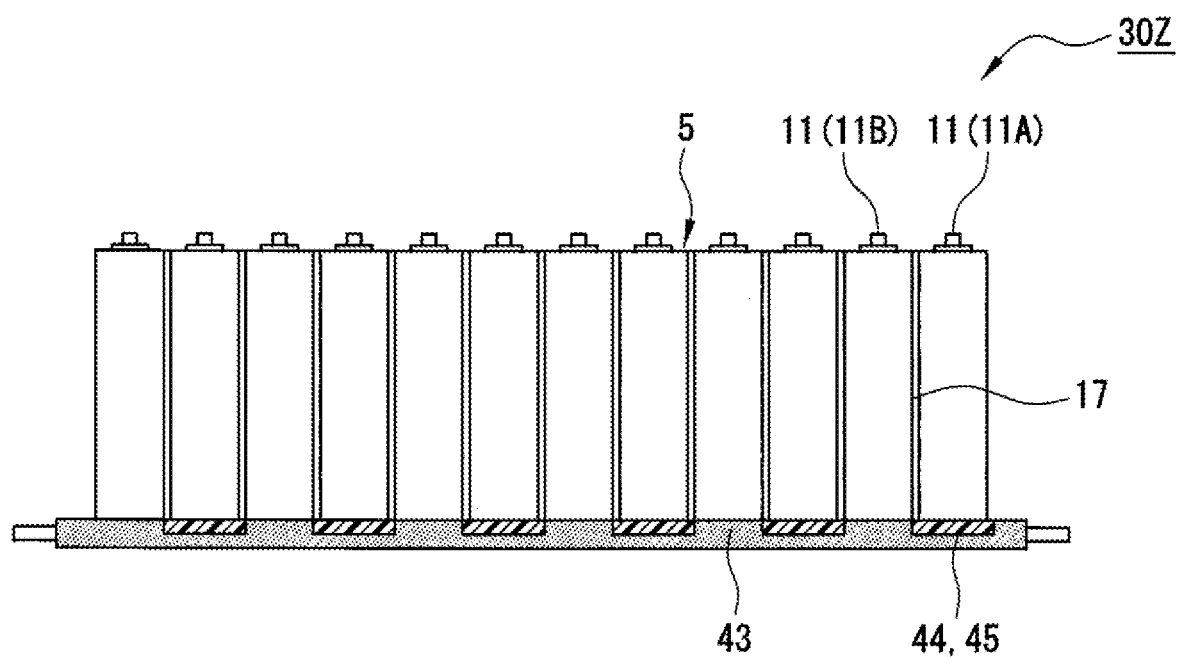
FIG. 9 is a cross-sectional view of a modification of the battery module according to the second exemplary embodiment.

FIG. 9 is a cross-sectional view of battery module 30Z, a modification of the battery module according to the second exemplary embodiment. As illustrated in FIG. 9, battery module 30Z differs from battery module 30 in that low thermally-conductive material member 45 that is lower in thermal conductivity than cooling plate 40 is interposed between first plate 41 and each battery 11B and between second plate 43 and each battery 11A. Low thermally-conductive material member 45 is disposed in the depressions of the plates, for example. In this case, the plates with low thermally-conductive members are in contact with undersurfaces of all batteries 11. Thus, this configuration has advantages such as increased support for batteries 11. This configuration also enables battery module 30Z to lower concentration of heat on a battery disposed next to an abnormal battery and satisfactorily avert sequential extension of thermal harm. Low thermally-conductive material member 45 is formed of a material similar to the material for low thermally-conductive member 25 described above.

Figure 10:
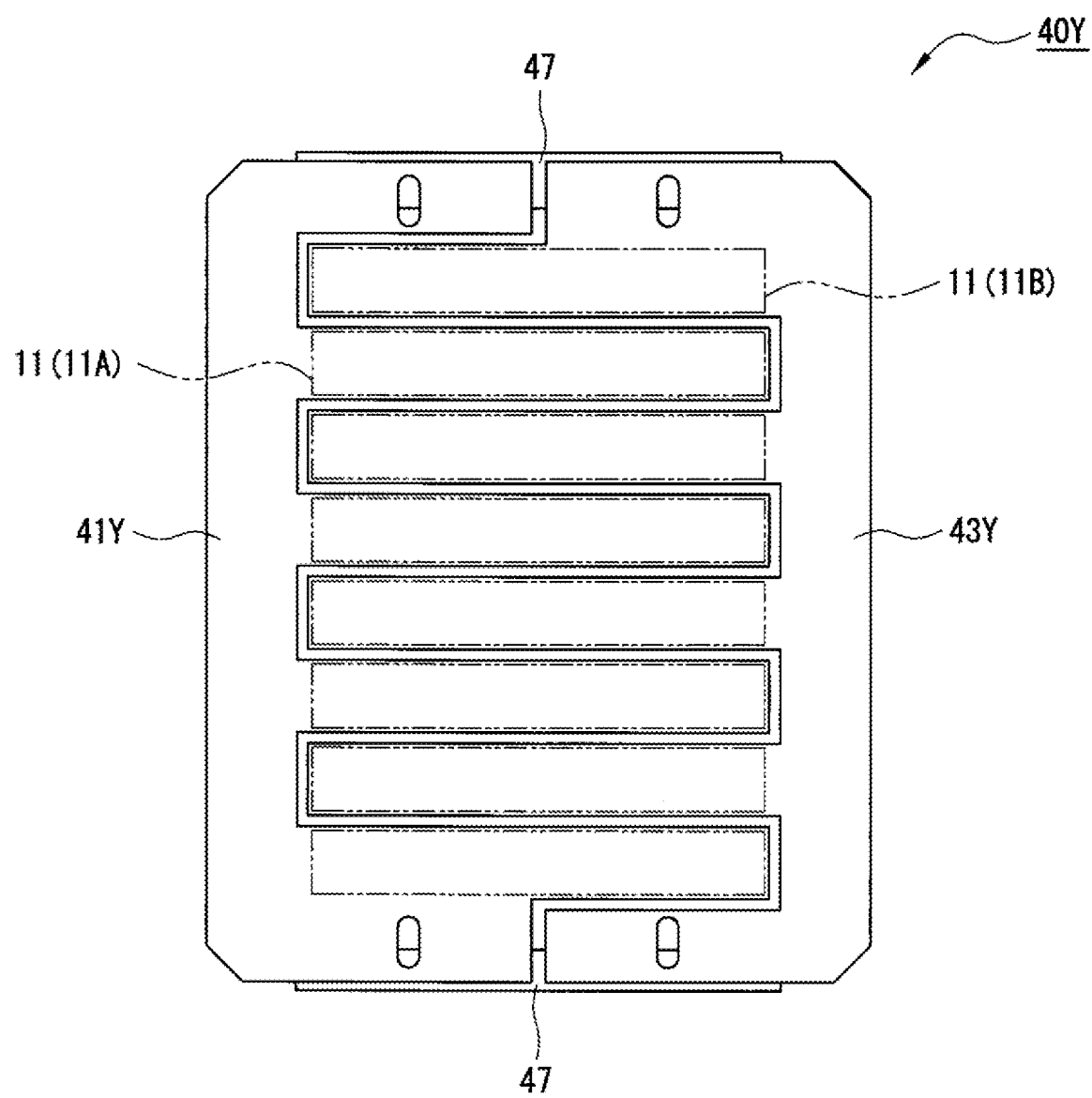
FIG. 10 is a plan view of a cooling plate used in the modification of the battery module according to the second exemplary embodiment.

FIG. 10 is a plan view of cooling plate 40Y used in a modification of the battery module according to the second exemplary embodiment. In FIG. 10, batteries 11 disposed on cooling plate 40Y are indicated with a two-dot chain line. As illustrated in FIG. 10, first plate 41Y and second plate 43Y are each formed into a comb shape. The plates mesh with each other such that teeth of the plates are not put into contact with each other, with a gap left between the plates. First and second plates 41Y and 43Y have respective individual flow paths for a refrigerant. The refrigerant flows through the paths independent of each other. First and second plates 41Y and 43Y are thermally isolated from each other. In an example shown in FIG. 10, the comb teeth of first and second plates 41Y and 43Y are formed so as to correspond with respective positions of batteries 11A and 11B and fit an undersurface profile of batteries 11. First and second plates 41Y and 43Y may be connected with each other via coupler 47.

In this exemplary embodiment, a plurality of batteries 11 making up battery assembly 5 is put on cooling plate 40Y. Surfaces of batteries 11 in contact with cooling plate 40Y may be lateral surfaces of batteries 11 making up battery assembly 5, other than the undersurfaces of batteries 11. Even in this case, the comb teeth of first and second plates 41Y and 43Y are formed so as to correspond with respective positions of batteries 11A and 11B. The comb teeth of first and second plates 41Y and 43Y are formed so as to fit a lateral surface profile of batteries 11.

First and second plates 41Y and 43Y are each in contact with alternate batteries 11 of batteries 11 making up battery assembly 5. The two plates are disposed such that first plate 41Y is in contact with batteries 11A, whereas second plate 43Y is in contact with batteries 11B. Meanwhile, first plate 41Y is not in contact with batteries 11B, whereas second plate 43Y is not in contact with batteries 11A. Thus, in the structure of the battery module having cooling plate 40Y, no heat transfer channel is shared by adjacent batteries 11. Accordingly, first plate 41Y has resistance that is higher to heat from batteries 11B than to heat from batteries 11A, whereas second plate 43Y has resistance that is higher to heat from batteries 11A than to heat from batteries 11B. In other words, owing to cooling plate 40Y, separate heat transfer channels are formed for adjacent batteries 11.

The invention claimed is:

1. A battery module comprising:
a battery assembly having a plurality of first batteries and a plurality of second batteries that are alternately stacked, wherein each of the plurality of the first and second batteries has two main surfaces perpendicular to a stacking direction of the plurality of first and second batteries, each of the plurality of the first and second batteries has two side surfaces located on an edge in a direction perpendicular to the stacking direction, and the two side surfaces of each of the plurality of first and second batteries are parallel to the stacking direction of the plurality of first and second batteries;
a first thermally-conductive member, wherein the first thermally-conductive member is a binding bar including a first component and a second component that are each disposed along the stacking direction of the plurality of first and second batteries, the first thermally-conductive member holding or supporting the battery assembly;
a second thermally-conductive member, wherein the second thermally-conductive member is a cooling plate comprising a third component and a fourth component that are each disposed along the stacking direction of the plurality of first and second batteries, and the second thermally-conductive member is configured to cool the battery assembly and is disposed such that the third component is only in contact with the first batteries and the fourth component is only in contact with the second batteries; and
a pair of end plates, wherein the battery assembly is placed between the pair of end plates in the stacking direction of the plurality of first batteries and the plurality of second batteries,
wherein the first component has a heat resistance to the second batteries higher than to the first batteries, and the second component has a heat resistance to the first batteries higher than to the second batteries,
wherein the first component contacts one of the two side surfaces of each of the plurality of first batteries, and the second component contacts one of the two side surfaces of each of the plurality of second batteries,
wherein the first thermally-conductive member is fixed to the pair of end plates to bind the plurality of first batteries and the plurality of second batteries together, and
wherein portions of the first component and the second component, which are located between the pair of end plates in the stacking direction, do not overlap the plurality of first batteries and the plurality of second batteries when seen in the stacking direction.

2. The battery module according to claim 1, wherein a low thermally-conductive material member that is lower in thermal conductivity than the first thermally-conductive member is interposed between the first component and each of the second batteries and between the second component and each of the first batteries.

3. The battery module according to claim 1, wherein the third component and the fourth component of the cooling plate have respective individual flow paths for a refrigerant.

4. The battery module according to claim 1, wherein a low thermally-conductive material member that is lower in thermal conductivity than the first thermally-conductive member is interposed between the first component and each of the second batteries and between the second component and each of the first batteries.

5. The battery module according to claim 1, wherein a low thermally-conductive material member that is lower in thermal conductivity than the second thermally-conductive member is interposed between the first component and each of the second batteries and between the second component and each of the first batteries.

6. The battery module according to claim 1, wherein the first component includes a plurality of first projections contacting with one of the two side surfaces of each of the plurality of first batteries, and wherein the second component includes a plurality of second projections contacting with one of the two side surfaces of each of the plurality of first batteries.

7. The battery module according to claim 6, wherein the dimension of a distal surface in each of the first projections is smaller than that of each of the side surfaces of each of the plurality of first batteries in the stacking direction, and wherein the dimension of a distal surface in each of the second projections is smaller than that of each of the side surfaces of each of the plurality of batteries in the stacking direction.

* * * * *